UNITED STATES PATENT OFFICE.

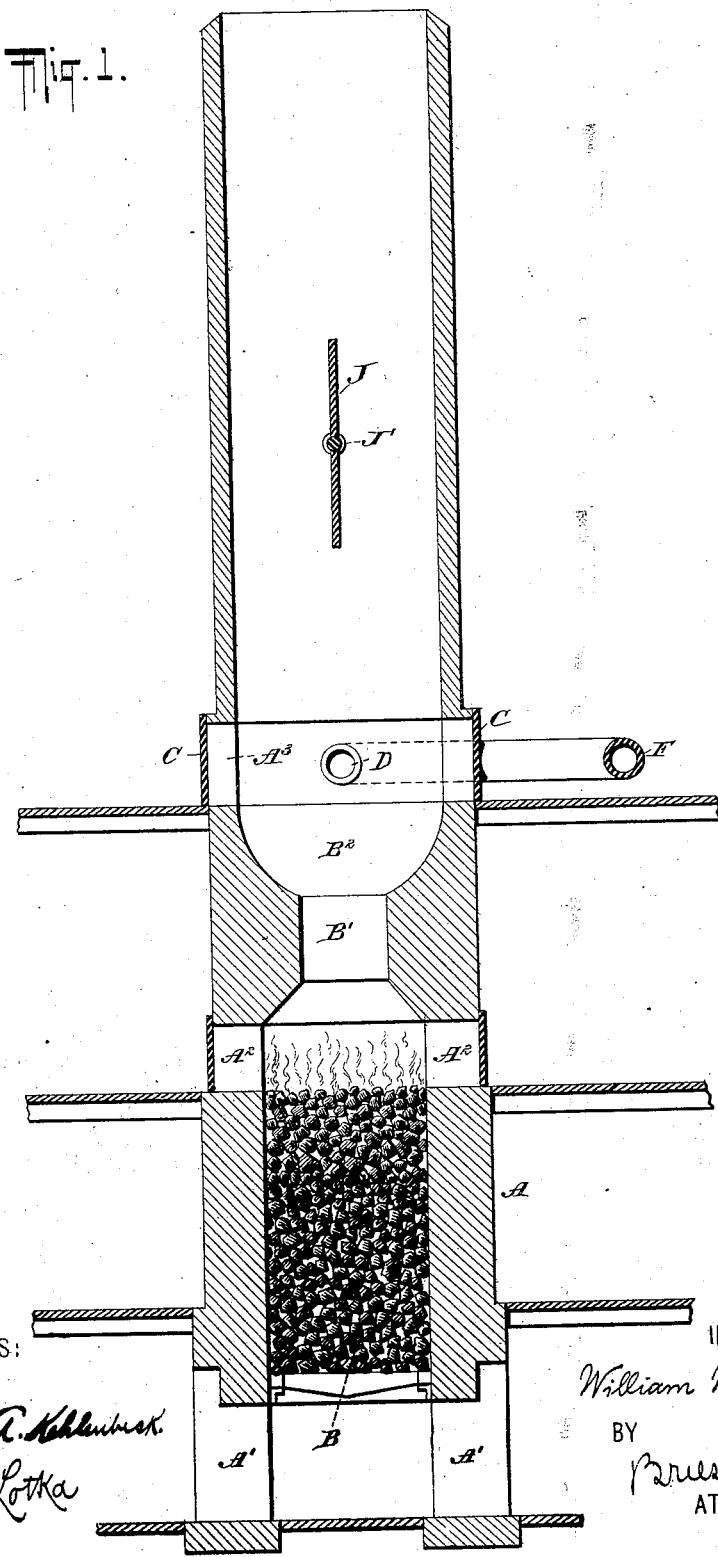

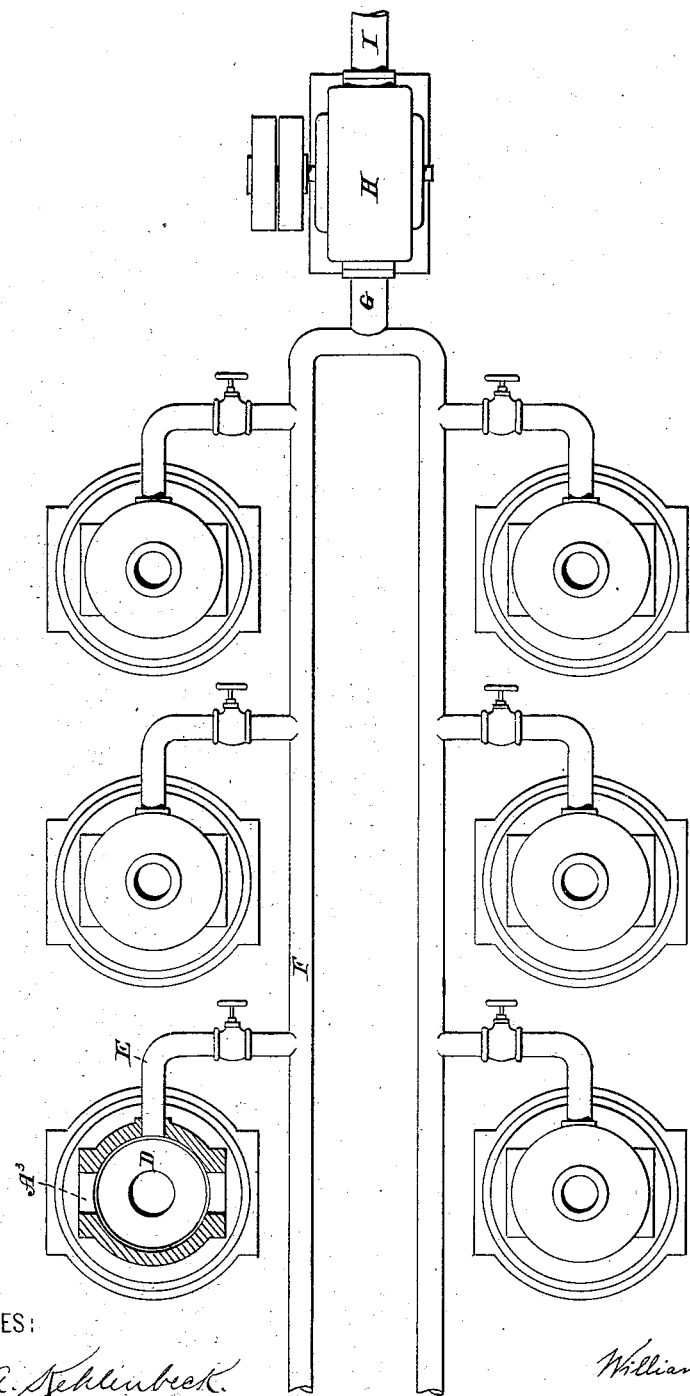

WILLIAM W. MACLAY, OF GLENS FALLS, NEW YORK.

CEMENT-KILN.

SPECIFICATION forming part of Letters Patent No. 725,975, dated April 21, 1903.

Application filed January 25, 1902. Serial No. 91,155. (No model.)

*To all whom it may concern:*

Be it known that I, WILLIAM W. MACLAY, a citizen of the United States, residing in Glens Falls, in the county of Warren, State of New York, have invented certain new and useful Improvements in Continuous-Burning Portland-Cement Kilns, of which the following is a specification.

My invention relates to continuous-burning Portland-cement kilns, and has for its object to increase the efficiency of such kilns.

It has been found in practice that Portland-cement kilns of the continuous-burning type cannot be operated successfully unless the temperature is kept within a comparatively narrow range from a predetermined temperature at which the reaction is most perfect.

The object of my invention is to enable the temperature to be regulated and an energetic reaction to be kept up in an economical way. I make use of a suction device arranged to draw air through the kiln in adjustable quantities. This suction device I connect with the kiln at the preheating-chamber thereof, which is located above the combustion-chamber. The result is that the temperature in the kiln, and especially at the zone of most intense combustion, can be minutely regulated, thereby producing an amount of clinker greater than that produced by other methods and of a superior quality. Another result is a more energetic combustion, so that the process is completed in a much shorter time than usual, and the charge may be withdrawn at the bottom of the kiln much more frequently than according to the customary procedure. A further advantage is that the inert products of combustion, especially carbonic-acid gas, are rapidly drawn away from the burning fuel, both solid and gaseous, and the blanketing of the fire at any point and the interference with the maintenance of the proper temperature at the zone of most intense combustion are avoided. The use of a suction-draft is superior to that of a forced draft, not only for the reason that it is more readily controlled, but also for the further reason that there is no tendency to blow the combustion products out through any cracks of the kiln and also that an inward draft is produced in the fuel-supply channels.

Further results and advantages of my device will be shown below in the description of the device.

In the accompanying drawings I have shown an example of a kiln embodying my invention, without, however, limiting myself to the particular construction shown.

Figure 1 is a sectional elevation of a kiln provided with my improvement; and Fig. 2 is a plan with parts in section, illustrating the arrangement of a regulatable suction device or blower in connection with a series of kilns.

In carrying out my invention I make use of a continuous-burning Portland-cement kiln of any suitable type—for instance, one of the character shown in Fig. 1, where A designates the kiln-body, having at the bottom openings A', through which the finished product is removed, while at $A^2$, I have indicated the fuel-supply channels, which lead into the combustion-chamber B and which are generally closed at their outer ends except when fuel is to be introduced. Above the combustion-chamber is a throat B', and above this is arranged a preheating-chamber $B^2$, into which the raw material to be converted into Portland cement is fed through openings $A^3$, normally closed by doors C. The kilns are generally arranged in pairs, as indicated in Fig. 2, and preferably the doors C are located on the inner and outer sides of each kiln. At a suitable point above the combustion-chamber B and preferably at about the same level as the doors C, I provide suction-openings D, which are connected, as by pipes E, with suction-conduits F, each of which connects with the suction-port or suction-pipe G of any suitable suction device, such as a centrifugal blower or exhauster H. By regulating the action of the blower or exhauster I regulate the amount of air drawn through the kilns, and thereby the temperature in the kilns. The outlet of this exhauster (indicated at I) may simply lead into the atmosphere or to any place at which the products withdrawn by suction from the kilns may be stored or utilized. It will of course be understood that by the provision of suitable valves in the pipes E any one of the kilns may be disconnected from the suction device or the amount of suction for each individual kiln still further regulated.

As suction is exerted by means of the exhauster H the gaseous products of combustion will be withdrawn from the combustion-chamber B through the throat B' and the preheating-chamber B², and at the same time a supply of air will be drawn in at the bottom of the kiln through the openings A'. Combustion will therefore be very energetic, and the conversion of material into Portland cement will take place in a much shorter time than with the ordinary cement-kilns. As the draft is a suction-draft, it will at the time the channels A² are opened for the introduction of further fuel cause an inward draft in said channels and will thus prevent the disagreeable rise of smoke from said channels. It will also be obvious that there will not be the least danger of the products of combustion escaping to the outside of the kiln through any imperfect joints, as, if there are such imperfections in the structure, they will simply cause an additional supply of air to be drawn into the kiln through them.

The most important advantage derived from the use of my device is the regulation of the temperature at what I term the "zone of most intense combustion." It is known that in cement-kilns there is a region or zone in which the temperature is normally higher than in the other portions of the kiln, because of the fact that combustion is most active in this region or zone. This zone is at or near that portion of the kiln where the fuel is introduced and meets the raw material coming from above. In Fig. 1 this zone would be approximately at or just below the upper line of the fuel B. It is known that in order to produce a marketable cement the temperature in the kiln in the zone of the most intense combustion must be kept as nearly as possible in the neighborhood of 3,000° Fahrenheit. If the temperature is allowed to fall much below this point, an inferior unmarketable cement is produced. If allowed to rise much above this point, the production will be a vitrified mass, inert and valueless. By the use of my device I am enabled by regulating the amount of air drawn through the kiln to keep the temperature in the zone of most intense combustion at a constant point without difficulty and with a much smaller expenditure of fuel than heretofore.

A further important commercial advantage of my device is that it enables the raw material to be fed into the kiln in bricks containing a greater percentage of moisture than heretofore. It is well known that the raw material will clog up the kiln and prevent a proper draft, and in extreme cases all draft whatsoever, if fed into the kiln in such a manner that it will quickly crumble to a dust. In order to avoid this difficulty, the powdered limestone or clay or their equivalents have been moistened and pressed into the form of bricks and the bricks have been wholly or in part dried, so as to expel most of the moisture. The heat in the kiln serves to harden the brick. If, however, the bricks have not been sufficiently dried, the heat of the kiln will convert the moisture into steam, thus crumbling the brick and clogging the kiln. I find that by the use of my device I do not have to dry my bricks as thoroughly and as carefully as has been necessary heretofore. I find that because of the increased draft, and especially by the concentration of the same in the throat B', the combustible gases given out by the fuel are all burned before they reach the preheating-chamber B² and that my bricks are first exposed not as in other kilns to the flames of the gases, but only to the heated products of combustion. The bricks are thus slowly dried and the formation of steam in them is avoided. By the time the bricks reach the flames of the gases they are sufficiently dried to remain intact.

It will of course be understood that my invention involves the use of means for closing the kiln at the top. This may be done by simply putting a plate or cover at the top of the kiln, or, and this is prefered, a damper J, pivoted at J', may be provided, as shown in Fig. 1. With the damper fully closed the blower will act simply to draw the combustion products from the kiln. If it is found that the action of the blower is too energetic, the damper may be opened slightly, so as to allow some air to enter the kiln from the top. In this case only a portion of the suction force of the exhauster H would be used to draw air through the combustion-chamber. Thus by means of the damper the amount of air drawn through the combustion-chamber, and consequently the temperature in said chamber, may be further regulated. For the purpose of making repairs the damper could be opened fully, as shown in Fig. 1.

What I claim as new, and desire to secure by Letters Patent, is—

1. A continuous-burning Portland-cement kiln, having a regulatable suction device connected with the kiln at a point above the zone of most intense combustion.

2. A continuous-burning Portland-cement kiln, having a regulatable suction device connected with the kiln at a point above the upper line of the raw material, substantially as described.

3. A continuous-burning Portland-cement kiln comprising a vertical shaft-like structure having openings at the bottom and provided with a combustion-chamber, a throat above said chamber, and a preheating-chamber above said throat, in combination with a regulatable suction device connected with said preheating-chamber.

4. A continuous-burning Portland-cement kiln, comprising a shaft-like structure having openings at the bottom and provided with a combustion-chamber, a throat above said combustion-chamber, and a preheating-chamber above said throat, in combination with a regulatable suction device connected with said preheating-chamber, and with a valve or damper located between said preheating-chamber and the top of the kiln so that the draft exerted through the combustion-chamber by the suction device may be regulated by adjusting the said damper.

In testimony whereof I have signed my name to this specification in the presence of two subscribing witnesses.

WILLIAM W. MACLAY.

Witnesses:
JOHN LOTKA,
HENRY M. TURK.